Dec. 6, 1938.    C. J. BLEIL    2,139,401
CONTINUOUS SELF-CLEANING FILTER
Filed Oct. 9, 1936    3 Sheets-Sheet 2
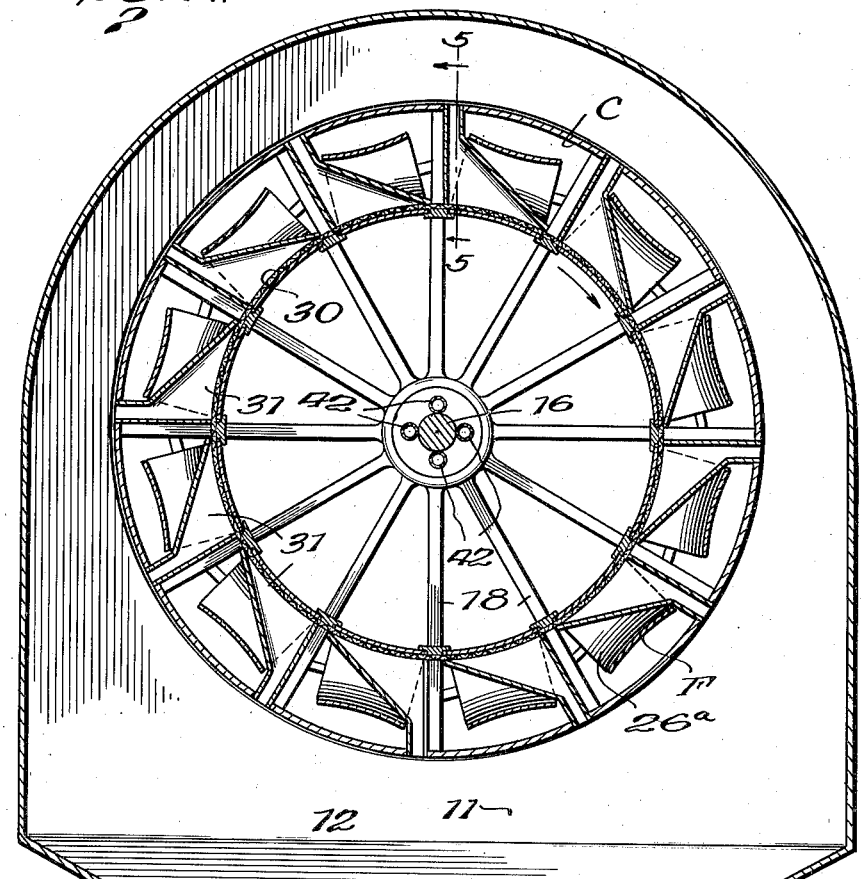
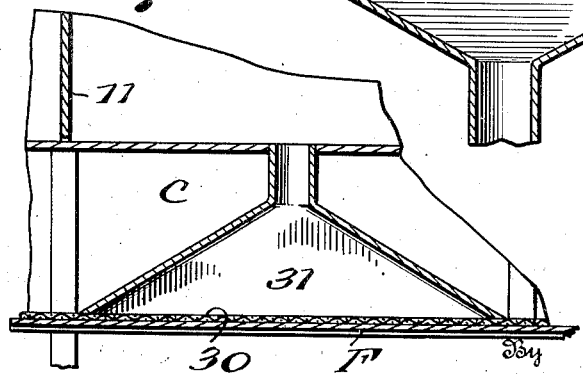
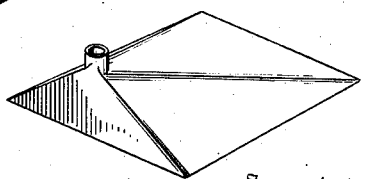
Inventor
C. J. Bleil,
By Wm D. Hodges
Attorney Dec. 6, 1938.  C. J. BLEIL  2,139,401
CONTINUOUS SELF-CLEANING FILTER
Filed Oct. 9, 1936  3 Sheets-Sheet 3

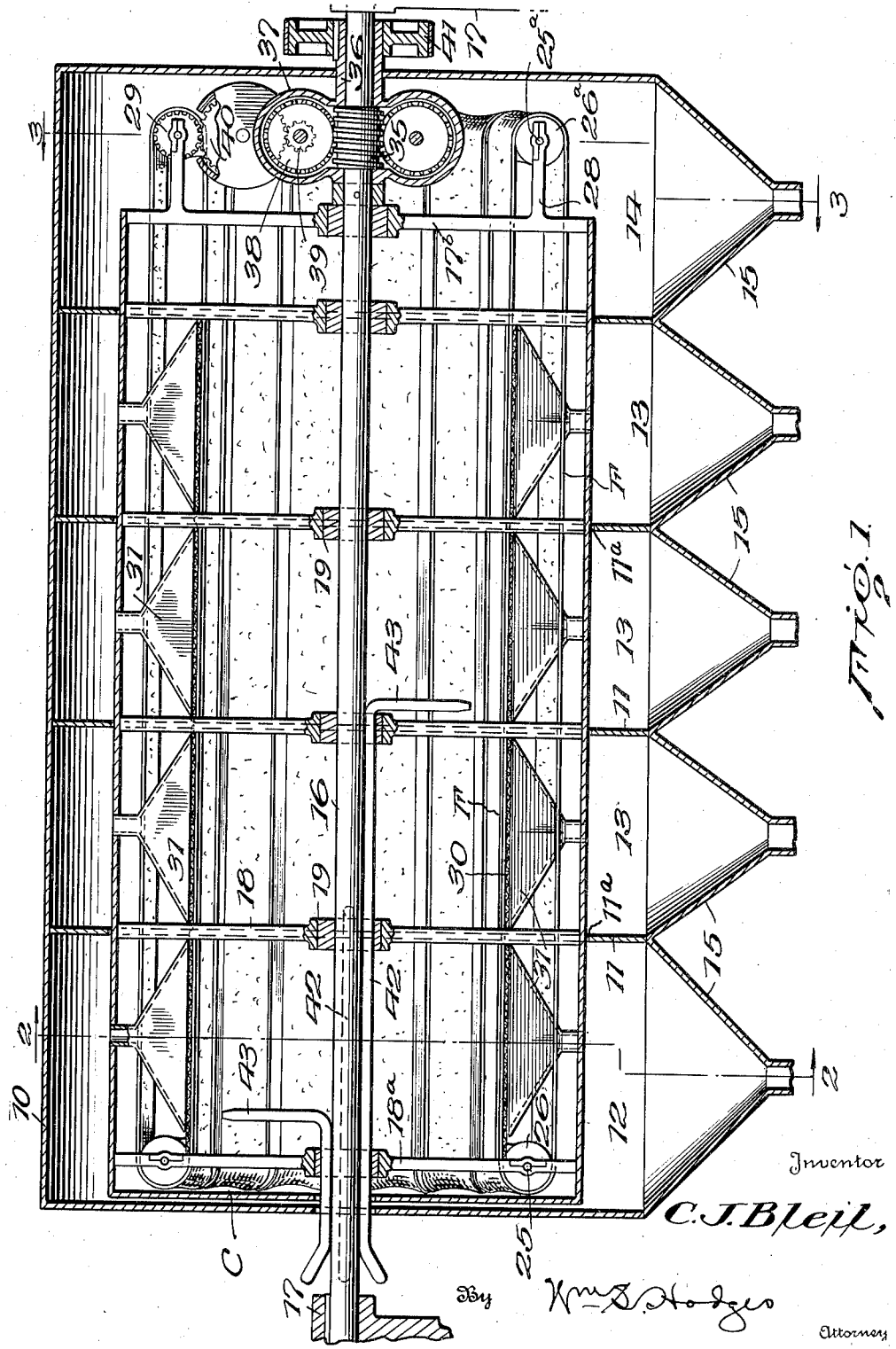

Inventor
C. J. Bleil,
By Wm. S. Hodges
Attorney

Patented Dec. 6, 1938

2,139,401

UNITED STATES PATENT OFFICE 2,139,401

CONTINUOUS SELF-CLEANING FILTER

Clarence J. Bleil, Medford, Oreg.

Application October 9, 1936, Serial No. 104,894

7 Claims. (Cl. 210—68)

This invention is a filtering apparatus which is primarily designed for use where solids must be thoroughly washed sufficiently to free them of solutions carried thereby, such as weak acids, alkalis, solvents, etc., although not limited to such use.

One of the objects of the invention is to provide a filtering apparatus of the continuous type, so constructed and arranged that the filtering functions are greatly facilitated by the action of centrifugal force. A further object is to provide a filtering apparatus with a main chamber of cylindrical form, mounted to rotate upon a horizontal axis, and a series of longitudinally disposed flexible filter beds lining said chamber, and arranged to travel longitudinally of the chamber during rotation thereof. A further object is to provide simple mechanism for effecting simultaneous rotation of the chamber and longitudinal movement of the filter beds. A further object is to provide simple and efficient means for collecting the liquids at various positions along the lines of travel of the filter beds, as the liquids are forced through the beds by centrifugal force developed by rotation of the chamber, and other means for separately collecting the solids.

The invention will be hereinafter fully set forth and particularly pointed out in the claims.

In the accompanying drawings:—

Figure 3:
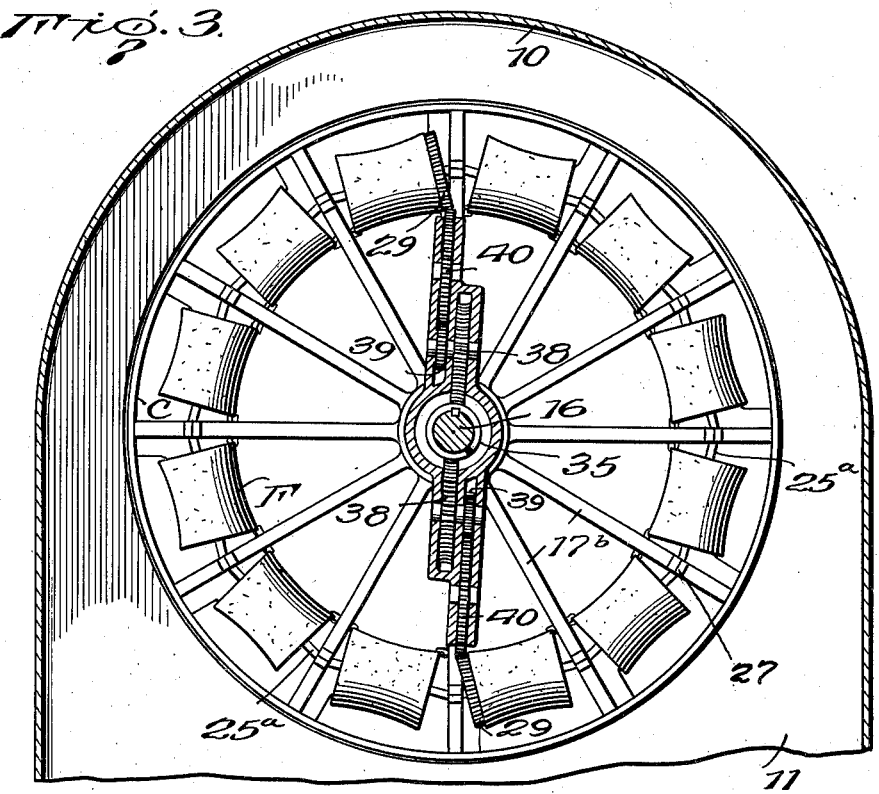
Figure 4:
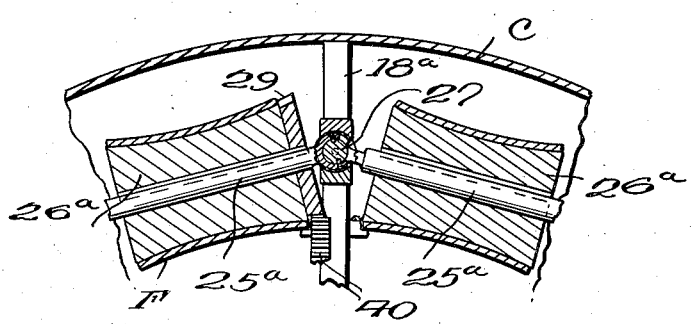

Figure 1 is a longitudinal sectional view illustrating a filtering apparatus constructed in accordance with the invention. Figure 2 is a cross-sectional view taken on the line 2—2, Figure 1. Figure 3 is a cross-sectional view taken on the line 3—3, Figure 1. Figure 4 is a detail sectional view illustrating the universal joint connections of the roller shafts. Figure 5 is a detail sectional view and Figure 6 is a perspective view illustrating one of the liquid collection chambers.

Referring to the drawings, 10 designates a casing, preferably constructed of sheet metal, and divided into a plurality of zones or chambers by means of radial walls 11. The receiving zone or chamber is indicated by the numeral 12, the intermediate zone or chambers by the numeral 13, and the solids-discharge chamber by the numeral 14. Each chamber is provided with a hopper-like outlet 15.

Extended longitudinally through the casing 10 is a fixed shaft 16, supported in suitable bearings 17, said shaft being extended axially through a filter chamber C of cylindrical form, supported by spiders 18 and 18$^a$, which are provided with hubs 19 rotatively mounted on said shaft. It will be observed that the end wall of the chamber at the inlet end of the latter (at the left hand end as viewed in Figure 1) is closed, and that there is no wall at the other end. The periphery of the chamber C cooperates with the radial walls 11 to form the inner walls of the chambers 12, 13 and 14. It will be noted, however, that there is a slight clearance between said chamber and the inner edges of the partition walls 11, as indicated at 11$^a$.

Mounted in the spider 18$^a$, at the inlet end of the chamber C are a plurality of short shafts 25, each carrying a roller 26, the contiguous ends of adjacent shafts being movably connected with each other in any desired manner, such as by universal joints 27. Said shafts are preferably arranged in two series, and by reason of the universal joint connections, rotative force applied to any one of the shafts will effect rotation of all of the shafts of the same series.

Mounted in bearing arms 28 extended longitudinally from the spider 17$^b$ at the delivery end of the chamber C are shafts 25$^a$, each carrying a roller 26$^a$ and having their contiguous ends connected by universal joints 27 similar to those described in connection with the shafts 25 and for the same purpose, said shafts also being arranged in series, the number of series corresponding to the number of series of shafts 25, two of such series being shown in each instance. One roller of each series of rollers 26$^a$ is provided with a drive pinion 29, connected with a source of power to be later described.

The rollers 26 and 26$^a$ are preferably concaved longitudinally and each pair of said rollers 26 and 26$^a$ supports a belt-like filter member F of any suitable flexible filtering material. It will be observed that the filters F extend longitudinally of the chamber C and practically serve as a lining therefor, i. e. they are so arranged as to provide an approximately cylindrical filter bed. The portion of each filter that travels through a path nearest to the center of the chamber, is backed by a rigid foraminous member 30, which may be of perforated metal, wire screen or any other suitable material. Interposed between the screens 30 and the peripheral wall of the cylinder C are a plurality of liquid collection chambers 31, one for each filter member for each of the chambers 12 and 13, said chambers 31 being located in an annular series in each of the respective chambers 12 and 13. Each liquid collection chamber consists of an end wall 31$^a$ of triangular shape, a top wall 31$^b$ and side walls 31$^c$, also of triangular shape. The triangular portions are so arranged that the narrow ends thereof converge and join at a common point, where the outlet pipe 31ᵈ is located. See Figure 6. The open bottom portions of the chambers are covered by the respective screens 30 so that each chamber may receive liquid forced through the respective filter belts, and discharge said liquids into the outer chamber 13.

The shaft 16 is provided with a worm-portion 35 located within the chamber 14. Fixedly mounted on the shaft, and adjacent said worm-portion is a rotatively mounted sleeve 36, carrying a gear casing 37. Mounted on shafts carried by said gear casing are worm wheels 38 which mesh with said worm-portion, and smaller drive gears 39, meshing with gears 40, which in turn mesh with the pinions 29 on the rollers 26ᵃ. The sleeve 36 and the gear casing carried thereby are rotated by means of a drive pulley 41, receiving power in suitable manner from a source not shown.

The material to be filtered is introduced into the chamber C by means of pipes 42, which are introduced through a central opening in the closed end wall of the chamber, and are provided with radially disposed outlets 43, so disposed as to discharge the material directly against the filter belts F. Liquid washes may also be introduced in the same manner. In practice the material is fed through the pipes 42 under sufficient pressure to discharge it against the filters with considerable force, so that the centrifugal force developed during rotation of said chamber will hold the material in place on the filters, no matter what the radial positions they may occupy. This discharge under pressure also tends to force some of the liquid material through the filter bed at once.

In operation, rotation of the sleeve 36 and the casing 37, through the reaction of the worm gears 38 upon the worm 35 sets up a rotation of the chamber C about the shaft 15. This reaction causes the worm wheels to rotate as they travel in their orbits about the shaft, and rotation of the worm gears through the pinions 29 and gears 40, effects rotation of the rollers 26ᵃ. The rotation of the last mentioned rollers sets the filter belts into motion, so that they travel longitudinally of the chamber C, and effect rotation of the rollers 26. As the material is driven against the travelling filters F, the liquids are induced by the centrifugal force developed by rotation of said chamber, to flow into the chambers 31, and eventually outwardly through the outlets into the respective chambers 12 and 13, and therefrom through outlets 15. The residual solids still adhering to the belts by reason of the centrifugal force are discharged into chamber 14, the rotation of the rollers 26ᵃ creating sufficient centrifugal force in a direction longitudinally of the chamber to effectually cast them off.

The advantages of the invention will be readily understood by those skilled in the art to which it belongs. For instance it will be observed that a very simple form of filtering apparatus is provided, which may be continuous in operation, and which utilizes to a maximum degree the effect of centrifugal force in securing the filtering results. A further advantage is that by the arrangement of the filter beds to move longitudinally of the filter chamber, the said filter beds are rendered self-cleaning, and the material being acted upon is subjected to the filtering action for substantially long periods, depending upon the lengths of the filter belts and the speed of rotation of the filter chamber.

Having thus explained the invention and described a manner of constructing and using the same, although without attempting to set forth all of its forms or all manners of its use, what is claimed is:—

1. A filter of the character described comprising a horizontally disposed casing, a rotatably mounted filter chamber located within said casing and having openings communicating with said casing, a plurality of longitudinally extended and movably supported belt-like filter members located within the filter chamber and so arranged as to provide an approximately cylindrical filter bed spaced from but completely surrounding said shaft, means for causing all of said filter members to move simultaneously in the same direction longitudinally of the filter chamber, means cooperating with the last mentioned means for causing the filter members to rotate about said shaft, and collection chambers interposed between the respective filter members and the exterior wall of the filter casing, the base portions of said filter members being open so as to receive liquids passing through the filter members, each collection chamber having converging walls terminating in a discharge portion, said discharge portions communicating with the respective openings in the filter chamber.

2. A filter of the character described comprising a horizontally disposed casing, a rotatably mounted filter chamber located within said casing and having openings communicating with said casing, a plurality of longitudinally extended and movably supported belt-like filter members located within the filter chamber and so arranged as to provide an approximately cylindrical filter bed spaced from but completely surrounding said shaft, means for causing all of said filter members to move simultaneously in the same direction longitudinally of the filter chamber, means cooperating with the last mentioned means for causing the filter members to rotate about said shaft, foraminous backings extended longitudinally of the filter chamber and adjacent to the respective filter members, there being one of such backings for a portion of each of said filter members, said backings being so constructed and arranged as to constitute a foraminous wall between the filter members and the portions of the filter chamber which surround them, and collection chambers located outside of and adjacent to the respective foraminous backings, the base portions of said filter chambers being open so as to receive liquids passing through the filter members and the foraminous backings, each collection chamber having converging walls terminating in a discharge portion, said discharge portions communicating with the respective openings in the filter chamber.

3. A filter of the character described comprising a horizontally disposed casing, a rotatably mounted filter chamber located within said casing and having openings communicating with said casing, longitudinally spaced radial walls interposed between said casing and said filter chamber in such a manner as to provide a plurality of zones extending longitudinally of and surrounding said filter chamber, a plurality of longitudinally extended and movably supported belt-like filter members located within the filter chamber and so arranged as to provide an approximately cylindrical filter bed, means for causing all of said filter members to move simultaneously in one direction longitudinally of the filter chamber, means cooperating with the last mentioned means for causing the filter members to rotate about an axis, and a plurality of sets of collection chambers, there being one set for each of said zones, said collection chamber being interposed between the respective filter members and the exterior wall of the filter casing, the base portions of said filter members being open so as to receive liquids passing through the filter members, each collection chamber having converging triangular walls terminating in a discharge portion, said discharge portions communicating with the respective openings in the filter chamber.

4. A filter of the character described comprising a horizontally disposed casing, a rotatably mounted filter chamber located within said casing and having openings communicating with said casing, longitudinally spaced radial walls interposed between said casing and said filter chamber in such manner as to provide a plurality of zones extending longitudinally of and surrounding said filter chamber, a plurality of longitudinally extended and movably supported belt-like filter members located within the filter chamber and so arranged as to provide an approximately cylindrical filter bed, means for causing all of said filter members to move simultaneously in one direction longitudinally of the filter chamber, means cooperating with the last mentioned means for causing the filter members to rotate about an axis, a plurality of foraminous backings extended longitudinally of the filter chamber, there being one backing for each filter member, each backing being located between the reaches of its belt-like filter section and adjacent to the inner reach thereof, and a plurality of collection chambers interposed between the foraminous backings and the outer wall of the filter chamber with their base portions adjacent to the foraminous backings in such manner as to receive liquids passing through the filter members and said backings, each collection chamber having triangular walls converging to a common point and terminating in a discharge portion, said discharge portions communicating with the openings in said filter chamber.

5. A filter of the character described comprising a horizontally disposed casing, a fixed shaft extended through the casing, a filter chamber located within said casing and rotatably mounted on said shaft, said filter chamber having openings communicating with said casing, a plurality of foraminous backings extended longitudinally of the filter chamber, there being one backing for each filter member, each backing being located between the reaches of its belt-like filter section and adjacent to the inner ridge thereof, and a plurality of collection chambers interposed between the foraminous backings and the outer wall of the filter chamber with their base portions adjacent to the foraminous backings in such manner as to receive liquids passing through the filter members and said backings, each collection chamber having triangular walls converging to a common point and terminating in a discharge portion, said discharge portions communicating with the openings in said filter chamber, and a plurality of supply pipes extending longitudinally along the base and each having a radially disposed discharge nozzle, there being one discharge nozzle for each series of collection chambers.

6. A filter of the character described comprising a horizontally disposed casing, a stationary shaft extended longitudinally through said casing, a filter chamber located within said casing and rotatably mounted on said shaft, a plurality of longitudinally extended and movably supported belt-like filter members located within the filter chamber and so arranged as to provide an approximately cylindrical filter bed spaced from but completely surrounding said shaft, a worm on said shaft, a gear casing rotatively mounted on said shaft, gearing carried by said casing and engaging said worm, means connecting said gearing and said filter members so as to cause the latter to move simultaneously in the same direction longitudinally of the filter chamber, means for imparting rotative movement to said gear casing so as to cause it to travel in an orbit about said shaft, the connections between the gearing and said worm, and between the gearing and said filter members being such that longitudinal movement is simultaneously imparted to all of the filter members in the same direction longitudinally of the filter chamber and at the same time the filter chamber is rotated about said shaft as an axis, and means for supplying material to be filtered.

7. A filter of the character described comprising a horizontally disposed casing, a shaft extended longitudinally through said casing, a filter chamber located within said casing and rotatably mounted on said shaft, a plurality of longitudinally extended and movably supported belt-like filter members located within the filter chamber and so arranged as to provide an approximately cylindrical filter bed spaced from but completely surrounding said shaft, collection chambers interposed between the filter members and the exterior wall of the filter casing, there being a plurality of longitudinally disposed collection chambers arranged parallel with each of said filter members, each collection chamber having outwardly converging walls terminating in a discharge opening extended through the contiguous wall of the filter chamber, means dividing the casing into a pluraltiy of zones each having an outlet collection, each of the discharge openings of the collection chambers communicating with one of said zones, means mounted to travel in an orbit about said shaft for causing all of the filter members to move simultaneously in the same direction longitudinally of the filter chamber, means cooperating with said shaft and the last mentioned means for imparting rotative movement to the filter chamber during longitudinal movement of the filter members, and means for supplying material to be filtered.

CLARENCE J. BLEIL.